US008543141B2

(12) United States Patent  
Meiby et al.

(10) Patent No.: US 8,543,141 B2
(45) Date of Patent: Sep. 24, 2013

(54) PORTABLE COMMUNICATION DEVICE AND METHOD FOR MEDIA-ENHANCED MESSAGING

(75) Inventors: Linda J. Meiby, Malmo (SE); Robert Najdenovski, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 388 days.

(21) Appl. No.: 11/684,166

(22) Filed: Mar. 9, 2007

(65) Prior Publication Data

US 2008/0220797 A1    Sep. 11, 2008

(51) Int. Cl.
*H04W 4/00*    (2009.01)

(52) U.S. Cl.
USPC ......... 455/466; 455/567; 455/412; 455/414.1

(58) Field of Classification Search
USPC ............. 455/466, 567, 412, 414.1; 370/7.51, 370/7.52, 7.53; 704/260; 709/206, 247
See application file for complete search history.

(56) References Cited

U.S. PATENT DOCUMENTS

| | | | | |
|---|---|---|---|---|
| 6,473,621 | B1 * | 10/2002 | Heie | ............................. 455/466 |
| 6,975,988 | B1 | 12/2005 | Roth et al. | |
| 2002/0120701 | A1 | 8/2002 | Ohba | |
| 2005/0143102 | A1 * | 6/2005 | McEvilly et al. | ............. 455/466 |
| 2005/0223071 | A1 * | 10/2005 | Hosono | ......................... 709/206 |

FOREIGN PATENT DOCUMENTS

| | | |
|---|---|---|
| EP | 1 524 826 | 4/2005 |
| EP | 1 531 417 | 5/2005 |
| EP | 1 677 474 | 7/2006 |
| RU | 2192040 C2 | 10/2002 |
| WO | 03/096636 | 11/2003 |

OTHER PUBLICATIONS

International Search Report and Written Opinion for International Application No. PCT/IB07/002611 dated Apr. 16, 2008.
International Preliminary Report on Patentability for International Application No. PCT/IB07/002611 dated Jun. 10, 2009.
Decision on Grant of corresponding Russian Patent Application No. 2009137391, dated Mar. 1, 2013.

* cited by examiner

*Primary Examiner* — Manpreet Matharu
(74) *Attorney, Agent, or Firm* — Renner, Otto, Boisselle & Sklar LLP

(57) ABSTRACT

A portable communication device is equipped with a media-enhanced messaging application that facilitates generating text messages that are enhanced with media having wording or other characteristics that correspond to or match at least a portion of a text message input by a user of the portable communication device. The messaging application causes the portable communication device to receive text message input and search for media matching or corresponding to at least a portion of the received text message input. Media found based on the search is merged with the received text message input and transmitted to a remote device as a media-enhanced text message. The portable communication device equipped with media-enhanced text messaging functionality provides the user with message enhancement for emotional expression, enunciation and entertainment.

17 Claims, 4 Drawing Sheets

PORTABLE COMMUNICATION DEVICE AND METHOD FOR MEDIA-ENHANCED MESSAGING

TECHNICAL FIELD OF THE INVENTION

The present invention relates generally to portable communication devices, and, more particularly, to a portable communication device and method of generating media-enhanced messages.

DESCRIPTION OF RELATED ART

In recent years, portable communication devices, such as mobile phones, personal digital assistants, mobile terminals, etc., continue to grow in popularity. As the popularity of portable communication devices continues to grow, today's wireless landscape is rapidly changing as mobile phones and networks are being enhanced to provide features and services beyond voice communications. The wireless industry is experiencing a rapid expansion of mobile data services. In addition, the features associated with certain types of portable communication devices have become increasingly diverse. To name a few examples, many portable communication devices have cameras, text and multimedia messaging capability, Internet browsing functionality, electronic mail capability, video playback capability, audio playback capability, image display capability, position sensing capability and hands-free headset interfaces.

With the continued development of the speed and capacity of portable communication devices and communication systems in general, multimedia messaging service (MMS) is available and growing in popularity. MMS provides users with the capability to transmit messages including various media files, such as images, photos, music or voice clips and even videos. While multimedia messaging provides users with more robust communication compared to a standard text message, some users may find messaging in general to be a bit impersonal.

SUMMARY

In view of the foregoing, a need exists for additional mobile data services, and application programs for providing additional mobile data services, such as a media-enhanced messaging application program that facilitates creating and transmitting media-enhanced messages.

One aspect of the technology relates to a portable communication device including a memory and a controller coupled to the memory, wherein the controller executes a media-enhanced messaging application program stored on a machine-readable medium. When the media-enhanced messaging application program is loaded in memory in the portable communication device and executed, the program causes the portable communication device to receive text message input, to search for media matching or corresponding to at least a portion of the received text message input, and to merge the matching media with the text message input.

According to another aspect, the media-enhanced messaging application program causes the portable communication device to transmit a media-enhanced text message to a remote device.

According to another aspect, the media-enhanced messaging application program causes the portable communication device to search for media having verbal portions substantially corresponding to at least a portion of the received text message input.

According to another aspect, the media-enhanced messaging application program causes the portable communication device to search for songs having lyrics substantially matching or substantially corresponding to at least a portion of the text message input.

According to another aspect, the media-enhanced messaging application program causes the portable communication device to provide a user with a preview of one or more media-enhanced text messages based on media found during the search for media.

According to another aspect, the media-enhanced messaging application program causes the portable communication device to receive a user selection and/or user editing of at least one of the previewed media-enhanced text messages.

According to another aspect, the media-enhanced messaging application program causes the portable communication device to create a media-enhanced text message having received text message input accompanied by media lyrics substantially corresponding to at least a portion of the text message input.

According to another aspect, the media-enhanced messaging application program causes the portable communication device to create a media-enhanced text message having the received text message input accompanied by a first song lyric portion corresponding to a first portion of the received text message input and a second song lyric portion corresponding to a second portion of the received text message input.

According to another aspect, the media-enhanced messaging application program causes the portable communication device to suggest an alternative phrasing of the received text message input, the alternative phrasing better corresponding to media found during the search.

According to another aspect, the portable communication device is a mobile telephone.

Another aspect of the technology relates to a method of generating a media-enhanced text message implemented on a portable communication device that includes receiving text message input, searching for media corresponding to at least a portion of the received text message input, and merging the corresponding media with the text message input, thereby creating a media-enhanced text message.

According to another aspect, the method includes transmitting the media-enhanced text message to a remote device.

According to another aspect, searching for media includes searching for songs having lyrics substantially matching at least a portion of the received text message input.

According to another aspect, searching for media includes searching for songs having lyrics substantially corresponding to at least a portion of the received text message input.

According to another aspect, searching for media includes searching for songs based on a user-defined category of music.

According to another aspect, the method includes providing a user with a preview of one or more media-enhanced text messages based on media found during the searching step.

According to another aspect, the method includes receiving a user selection and/or user editing of at least one of the previewed media-enhanced text messages.

According to another aspect, merging includes incorporating corresponding portions of media found during the searching with corresponding portions of the text message input.

According to another aspect, the media-enhanced text message includes the text message input accompanied by media lyrics substantially corresponding to the text message input.

According to another aspect, the media-enhanced text message includes the text message input accompanied by a first song lyric portion corresponding to a first portion of the text message input and a second song lyric portion corresponding to a second portion of the text message input.

Another aspect of the technology relates to a program stored on a machine-readable medium, the program being suitable for use on a portable communication device, wherein when the program is loaded in memory in the portable communication device and executed causes the portable communication device to receive text message input, search for media matching or corresponding to at least a portion of the received text message input, and merge the matched media with the text message input resulting in a media-enhanced text message.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended thereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

Figure 1:
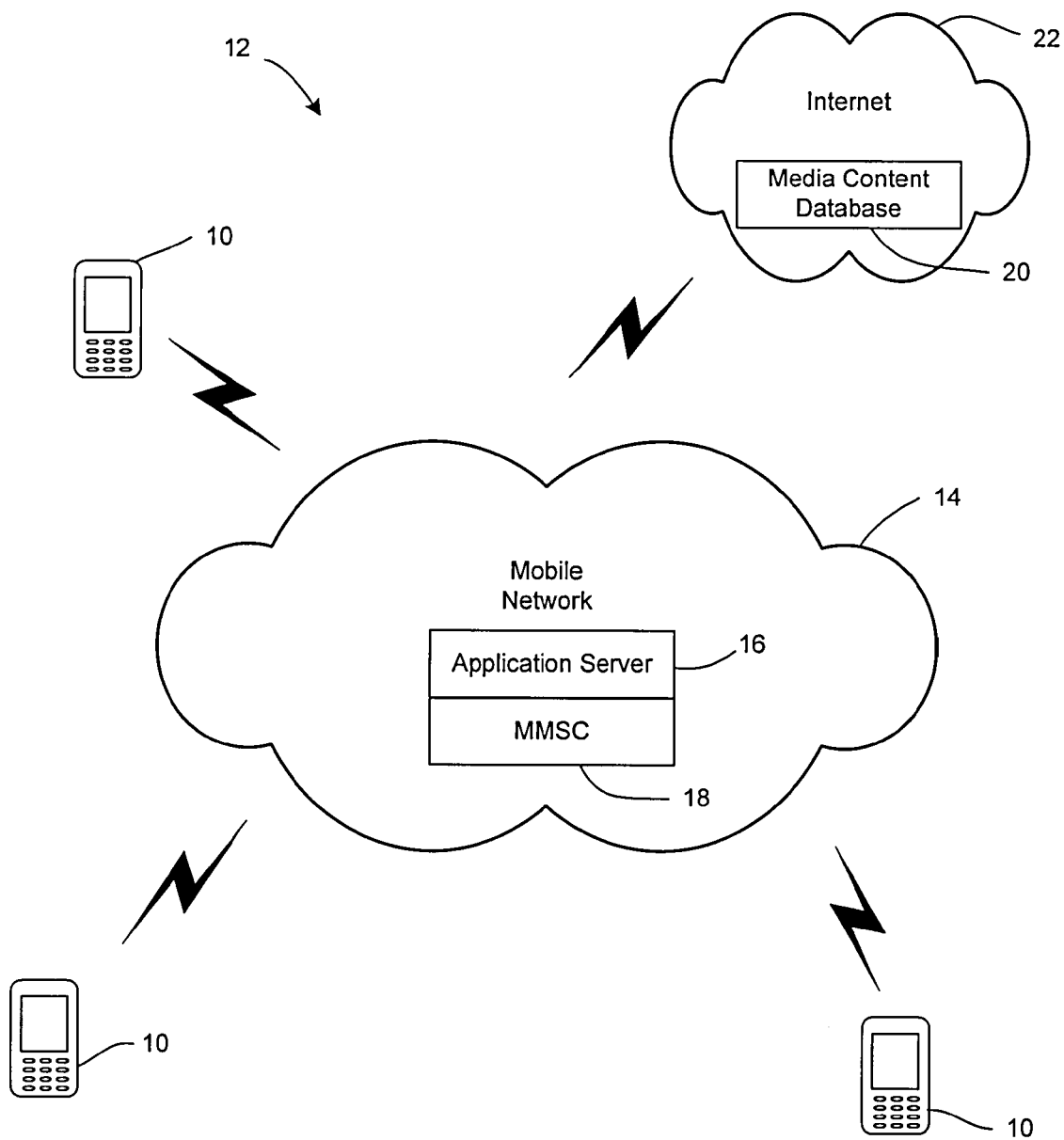
FIG. 1 is a diagrammatic illustration of a communications system including a portable communication device on which aspects of the technology may be carried out.

In the detailed description that follows, like components have been given the same reference numerals regardless of whether they are shown in different embodiments of the present invention. To illustrate the present invention in a clear and concise manner, the drawings may not necessarily be to scale and certain features may be shown in somewhat schematic form.

The present disclosure describes a portable communication device that is equipped with media-enhanced text messaging capability. After receiving text message input from a user, the portable communication device is equipped to search for media (e.g., songs, music clips, videos, video clips and the like), having wording or other characteristics that match or otherwise correspond to at least a portion of the user's text message input. Media found based on the search can be merged with the text message to create a media-enhanced text message. This functionality allows the portable communication device to provide the user with messaging enhancement for emotional expression, enunciation and/or entertainment.

As used herein, the term "portable communication device" includes portable radio communication equipment. The term "portable radio communication equipment," which may be referred to below as a mobile phone, a mobile device, a mobile radio terminal or a mobile terminal, includes all electronic equipment, including, but not limited to, mobile telephones, pagers, communicators, i.e., electronic organizers, smartphones, personal digital assistants (PDAs), or the like. While the present invention is being discussed with respect to portable communication devices, it is to be appreciated that the invention is not intended to be limited to portable communication devices, and can be applied to any type of electronic equipment capable of being used for voice and/or data communication as well as multimedia messaging.

Referring initially to FIG. 1, a portable communication device 10 may be configured to operate as part of a communication system 12. The communication system 12 includes a mobile network 14, such as a mobile cellular telephony network, that facilitates communication, such as voice communication and/or data transfer between a plurality of portable communication devices 10, such as mobile phones, mobile terminals or the like. The mobile network 14 includes one or more servers (referred to generally as application server 16) for managing calls placed by and destined to the portable communication device 10, as well as supporting one or more applications (e.g., media-enhanced messaging application) by (e.g., including appropriate hardware and/or application programs for generating, transmitting and receiving media-enhanced text messages). In the illustrated embodiment, the mobile network 14 also includes or is otherwise able to communicate with a multimedia messaging service center (MMSC) 18, which is operable to interact with one or more portable communication devices 14 (e.g., by uploading and downloading multimedia messages) to facilitate multimedia messaging between respective portable communication devices.

For purposes of the present discussion, the portable communication device 10 will be described with respect to generating or facilitating generation of media-enhanced text messages (also referred to simply as media-enhanced messages) based on user-defined text message input. In accordance with at least one embodiment, the portable communication device 10 may engage in media browsing and/or searching functionality with respect to media content stored on a remote system (e.g., a media content database or server 20 accessible via the Internet 22.)

It will be appreciated that the mobile network 14 includes a network infrastructure, portions of which are used or otherwise accessed by the portable communication devices. The portable communication devices 10 may interact with each other and/or the network infrastructure in accordance with any suitable communication standard, including, but not limited to, Advanced Mobile Phone Service (AMPS), Digital Advanced Mobile Phone Service (D-AMPS), General Packet Radio Service (GPRS), Universal Mobile Telecommunications System (UMTS), Global System for Mobile Communications (GSM), Code Division Multiple Access (CDMA), Voice-Over IP (VoIP), Session Initiated Protocol (SIP), Wireless Local Area Network (WLAN) or the like. In other words, the communication system shown in FIG. 1 is provided for purposes of explaining aspects of the present invention, without limiting the invention to a particular communication system design, architecture or communication standard.

Figure 2:
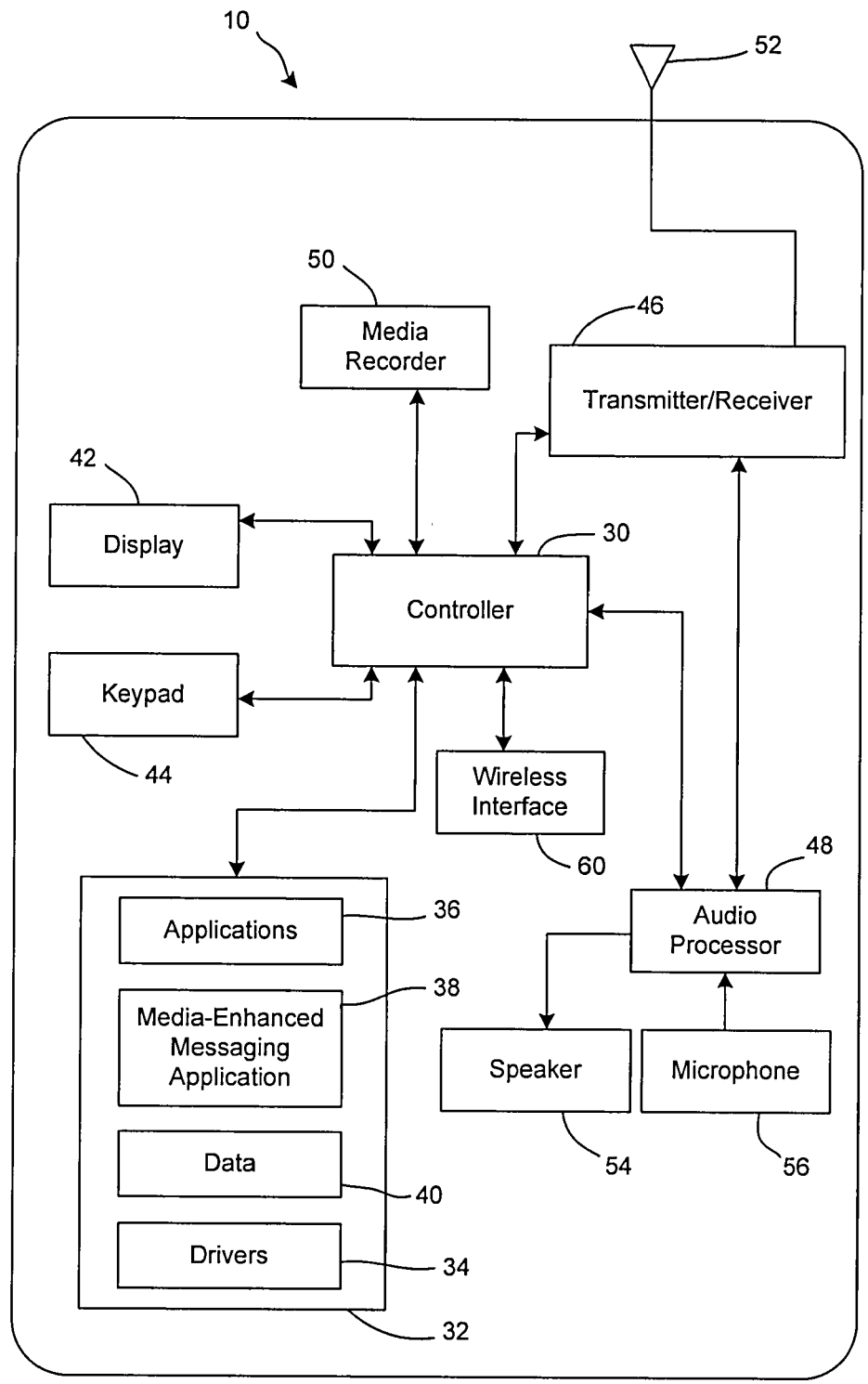
FIG. 2 is a diagrammatic illustration of a portable communication device in accordance with aspects of the technology.

FIG. 2 represents a functional block diagram of a portable communication device 10. The portable communication device 10 includes a controller 30 that controls the overall operation of the portable communication device. The controller 30 may include any commercially available or custom microprocessor or microcontroller. Memory 32 is operatively connected to the controller 30 for storing control programs and data used by the portable communication device. The memory 32 is representative of the overall hierarchy of memory devices containing software and data used to implement the functionality of the portable communication device in accordance with one or more aspects described herein. The memory 32 may include, for example, RAM or other volatile solid-state memory, flash or other non-volatile solid-state memory, a magnetic storage medium such as a hard disk drive, a removable storage media, or other suitable storage means. In addition to handling voice communications, the portable communication device 10 may be configured to transmit, receive and process data, such as text messages (also known as short message service or SMS), electronic mail messages, multimedia messages (also known as MMS), media-enhanced text messages, image files, video files, audio files, ring tones, streaming audio, streaming video, data feeds (e.g., podcasts) and so forth.

In the illustrated embodiment, memory 32 stores drivers 34 (e.g., I/O device drivers), application programs 36, including a media-enhanced messaging application program 38 (also referred to as a media-enhanced messenger or a media-enhanced messaging application), and application program data 40. The I/O device drivers include software routines that are accessed through the controller 30 (or by an operating system (not shown) stored in memory 32) by the application programs, including the media-enhanced messaging application program 38, to communicate with devices such as a display 42 and keypad 44 (e.g., a standard keypad, a QWERT keypad or a touch screen keypad) as well as other input/output ports.

The application programs, including the media-enhanced messaging application program 38, comprise programs that implement various features of the portable communication device 10, such as voice calls, e-mail, Internet access, multimedia messaging, contact manager and the like. As is described more fully below, the media-enhanced messaging application program 38 comprises a program, logic routine or code that enables the user to generate a media-enhanced text message based on text message text input by the user.

A person having ordinary skill in the art of computer programming, and specifically in applications programming for mobile phones, will consider it obvious in view of the provided description how to program a mobile phone to operate and carry out the functions described herein with respect to the media-enhanced messaging application 38 (and any interfacing between the media-enhanced messaging application 38 and other application programs (e.g., messaging application programs, such as a universal messenger program, media application programs and the like). Accordingly, details as to the specific programming code have been left out. Also, while the media-enhanced messaging functionality may be carried out via the controller 30 and media-enhanced messaging application 38 (alone or in conjunction with other application programs) in memory 32 in accordance with inventive aspects, such function also could be carried out via dedicated hardware, firmware, software or combinations thereof without departing from the scope of the present invention.

With continued reference to FIG. 2, the controller 30 interfaces with the aforementioned display 42 and keypad 44 (and any other user interface device(s)), a transmitter/receiver 46 (often referred to as a transceiver), audio processing circuitry, such as an audio processor 48, and a position determination element (not shown), such as a global positioning system (GPS) receiver. The portable communication device 10 may include a media recorder 50 (e.g., a still camera, a video camera, an audio recorder or the like) that captures digital pictures, audio and/or video. Image, audio and/or video files corresponding to the pictures, songs and/or video may be stored in memory 32 (e.g., in the case of music or video files, in a local media content database, which may be searched in accordance with the media-enhanced messaging functionality).

An antenna 52 is coupled to the transmitter/receiver 46 such that the transmitter/receiver 46 transmits and receives signals via antenna 46, as is conventional. The portable communication device includes an audio processor 48 for processing the audio signals transmitted by and received from the transmitter/receiver. Coupled to the audio processor 48 are a speaker 54 and microphone 56, which enable a user to listen and speak via the portable communication device. Audio data may be passed to the audio processor 48 for playback to the user. The audio data may include, for example, audio data from an audio file stored in the memory 32 and retrieved by the controller 30 or audio data associated with a generated or received media-enhanced text message. The audio processor 48 may include any appropriate buffers, decoders, amplifiers and the like.

The portable communication device also may include one or more local wireless interfaces (indicated generally as wireless interface 60), such as an infrared transceiver and/or an RF adapter, e.g., a Bluetooth adapter, WLAN adapter, Ultra-Wideband (UWB) adapter and the like, for establishing communication with an accessory, a hands free adapter, e.g., a headset that may audibly output sound corresponding to audio data transferred from the portable communication device 10 to the adapter, another mobile radio terminal, a computer, or any other electronic device. Also, wireless interface 60 may be representative of an interface suitable for communication within a cellular network or other wireless wide-area network (WWAN).

Figure 3:
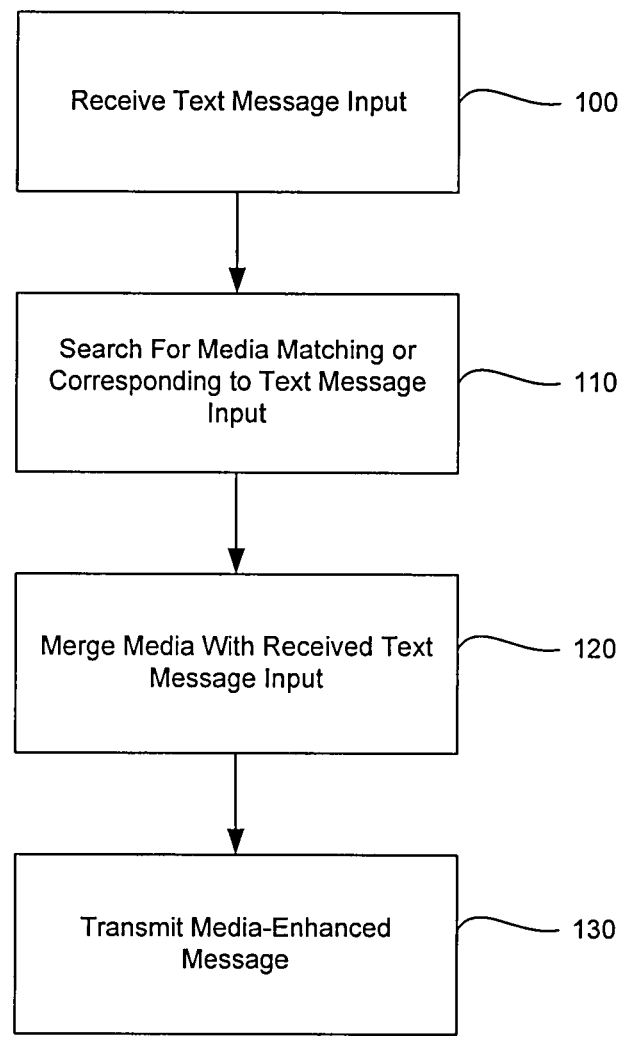
FIG. 3 is a flow chart or functional diagram representing a method of generating media-enhanced messages in accordance with one embodiment.
Figure 4:
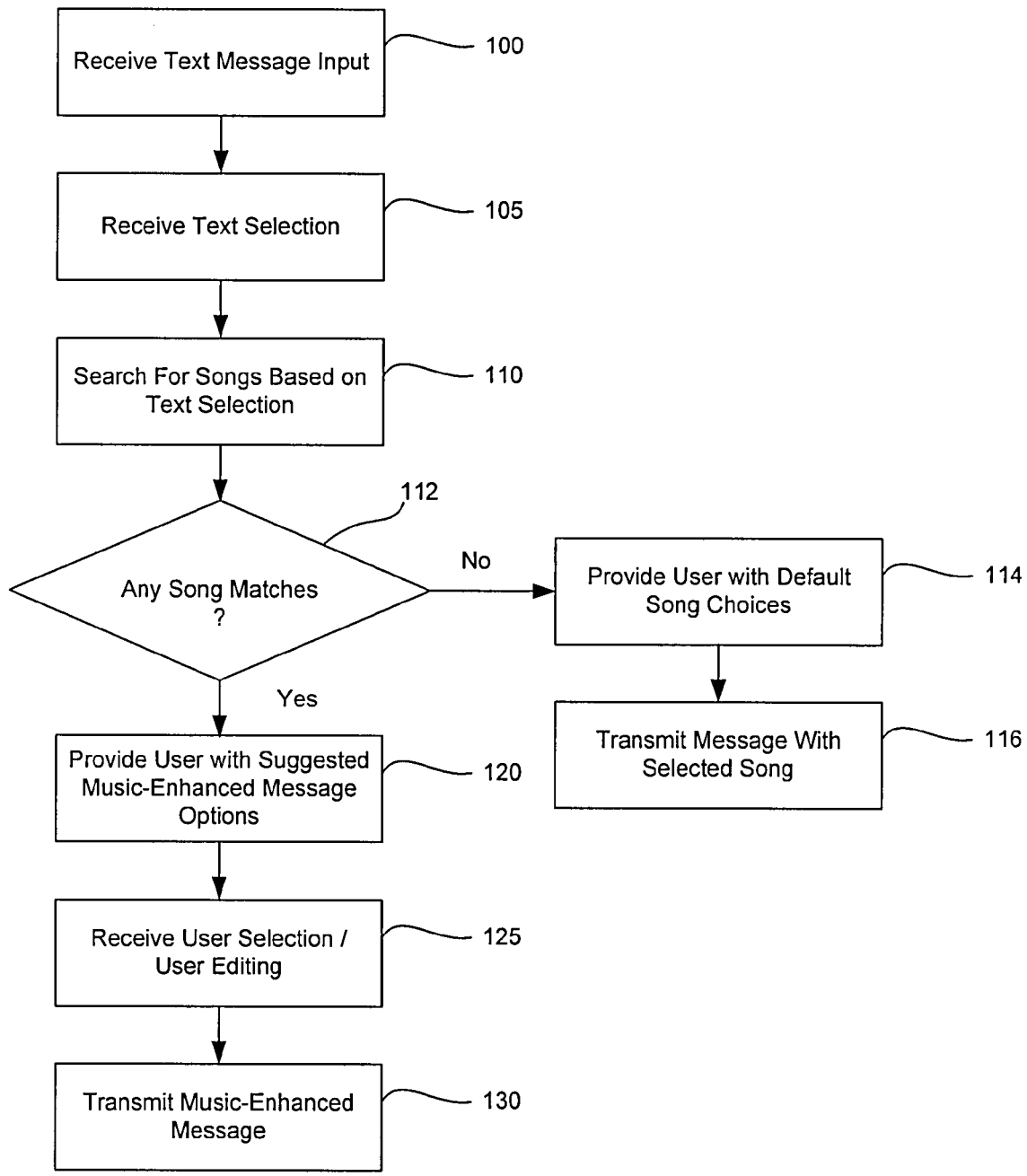
FIG. 4 is a flow chart or functional diagram representing a method of generating media-enhanced messages in accordance with another embodiment.

While for purposes of simplicity of explanation, the flow charts or functional diagrams in FIGS. 3-4 include a series of steps or functional blocks that represent one or more aspects of the relevant operation of the portable communication device 10. It is to be understood and appreciated that aspects of the invention described herein are not limited to the order of steps or functional blocks, as some steps or functional blocks may, in accordance with aspects of the present invention occur in different orders and/or concurrently with other steps or functional blocks from that shown or described herein. Moreover, not all illustrated steps or functional blocks of aspects of relevant operation may be required to implement a methodology in accordance with an aspect of the invention. Furthermore, additional steps or functional blocks representative of aspects of relevant operation may be added without departing from the scope of the present invention.

The methodologies illustrated in FIGS. 3-4, which are implemented on or through a portable communication device, relate to a method of generating a media-enhanced text message. Turning now to FIG. 3, a method of generating a media-enhanced text message begins at functional block 100 where the portable communication device receives text message input from a user of the portable communication device. Receiving text message input can include the typical entering or typing (e.g., using the keypad) of text that ultimately will be transmitted to some remote message recipient. Alternatively, the user may select a given string of text message text from a list of predefined messages. In one embodiment, the herein described media-enhanced messaging may be implemented or otherwise accomplished via a unified messenger application.

At functional block 110, the portable communication device conducts a search for media matching, substantially matching or otherwise corresponding to at least a portion of the received text message input. In one embodiment, the portable communication device initiates a search for media stored on or in a local memory of the portable communication device. Alternatively, the portable communication device may initiate a search for media stored in an external media library or media content database (e.g., an external music library where songs are available for download). Suitable media may include, but is not limited to, songs, music clips, other audio clips, movies, videos, video clips (e.g., video clips found on the YouTube™ website) and the like. Preferably, the portable communication device will initiate a search for media having lyrics, words and/or verbal portions that match, substantially match or otherwise correspond to all or part of the received text message input.

At functional block 120, the media found based on the search (functional block 110) may be merged with all or part of the received text message input, thereby creating a media-enhanced text message (also referred to simply as a media-enhanced message). For example, if the portable communication device locates one or more appropriate songs (e.g., songs having lyrics that match, substantially match or correspond to the received text message input) from the media search (functional block 110), a portion of the song or songs may be merged with the received text message input, such that the typed messages are transformed into a medley music format (e.g., a message in a medley music format including various rows or portions of text cut out of or otherwise extracted from different song lyrics where they are found). Stated differently, songs having lyrics that match, substantially match or otherwise correspond to the received text message input may be used or otherwise incorporated into a multimedia message to present the desired text message in a music medley format. This media-enhanced messaging may be thought of as "saying it with a song."

In one embodiment, it may be possible for a single song to include lyrics matching, substantially matching or otherwise corresponding to the majority of the text message input. Alternatively, portions of the text message input may be broken up and matched individually to portions of multiple songs, such that parts of the music pieces are fit together, for example, via a suitable music editing application. As will be discussed more fully below, the user may be presented with a variety of possible options based on the number of songs found as a result of the media search. In addition, the user may be provided with a variety of alternatives for wording of the text message. At functional block 130, assuming that a suitable media-enhanced message has been created, the media-enhanced message is transmitted to a remote device or recipient, for example, via a multimedia messaging service center (MMSC) or via another suitable communication link. As is discussed more fully below, the transmitted media-enhanced message may be displayed on a recipient's device (e.g., mobile phone) in one of a number of display formats.

Turning now to FIG. 4, an alternative embodiment of the method of generating a media-enhanced message begins at functional block 100 where the portable communication device receives text message input (e.g., a text string entered via the keypad of the portable communication device). At functional block 105, optionally the portable communication device prompts a user for and receives user input indicative of a selection of all or a portion of the received text message input. In other words, the user has the option of selecting a portion of the text message to be matched or otherwise merged with suitable media content. At functional block 110, the portable communication device searches for songs (or other suitable media) matching, substantially matching, corresponding to or otherwise based on the user's text selection. Stated differently, the portable communication device will initiate a search or searches for songs (or other suitable media) having lyrics or other audio information that match, substantially match or otherwise correspond to the selected text of the received text message input. While this exemplary embodiment is being described with respect to searching for songs based on the text selection, it is to be appreciated that this methodology also is applicable to any type of media, including, but not limited to movies, music clips, audio clips, videos, video clips and the like, whether stored locally on the portable communication device (in an internal music or media library) or stored remotely on a remote media content database (e.g., an external music or media library where music or other media is available to purchase and download). Suitable downloading services may include WAP or PlayNow or any other operator-specific downloading service, thereby providing a potential operator benefit in connection with the media-enhanced messaging application.

It will be appreciated that the search may be conducted using a variety of criteria in addition to simply matching lyrics or other verbal portions with a portion of the received text message. For example, the search may be based on a specific category or genre of song (e.g., love songs, rock songs, happy songs, sad songs, and the like.) It will be appreciated that some or all of the searching may be based on metadata associated with the media. For example, if the tone of the text message is meant to be more romantic, the search functionality may include executing a search where song lyrics match or substantially match the text in addition to searching for songs within a specific music category (e.g., romantic songs). Ideally, the portable communication device will find a song or songs (or other suitable media) having lyrics or wording that match or substantially match the entire portion of the text selection from the text message input. However, it will be appreciated that such songs or other media content may not exist. In such a case, the media-enhanced messaging application may possess functionality to parse the text selection such that one portion of the selected text may be matched with a first song or portion of a first song and a second portion of the selected text may be matched with a second song or portion of a second song.

At functional block 112, the portable communication device will determine (and communicate to the user of the device) whether or not any song or other media matches for the selected text or portion of the selected text have been found. If no suitable songs or other media have been found for the selected text or portion of the selected text, the media-enhanced messaging application may provide the user with a listing of default song choices, which may be based, in part, on the type of message being generated by the user (e.g., a romantic-themed message may be linked with a standard message or default romantic song, while a sad-themed message may be linked with a suitable default song choice) (functional block 114). In this case, the user may have the option of customizing the "voice" used in connection with the media-enhanced message. For example, the user can select a male voice or a female voice, a cartoon voice, a robot voice or the like. In addition the user may have the option of changing the order of lyrics, and, if the lyrics cannot be found, the user may have the option of recording suitable lyrics using a sound recorder associated with the portable communication device. In this instance, the characteristics of the voice delivering the lyrics may be changed or otherwise enhanced with effects like pitch, echo, reverb, flanger and the like. Once the media-enhanced message is assembled, the portable communication device may transmit the text message along with the selected default song (functional block 116).

At functional block 120, assuming that the search for songs or other media returns one or more matches or potential matches, the media-enhanced messaging application may provide the user with a preview of or suggested music-enhanced message options. For example, if three potential matching songs are found for a given text selection, the user may be able to select and preview each of the three to decide which is preferred to be transmitted as the media-enhanced message. Alternatively, in the case where some similar songs may be found (e.g., where the songs returned by the search (functional block 110) are not ideal or substantial matches to the selected text), the portable communication device may provide or otherwise suggest some alternative wordings for the message, which, ideally, will maintain the overall meaning of the message, while simply changing the wording. Another example of another possible preview may include two scenarios, one where a single song is found, but the song is not a substantial match for the majority of the selected text. Alternatively, in this exemplary embodiment, a second possible selection may include two songs—one song or portion thereof that substantially matches or corresponds to a first part of the selected text and a second song or portion thereof that substantially matches a second portion of the selected text.

At functional block 125, the user is provided with the option of selecting one of the suggested music-enhanced message options or otherwise editing the potential music-enhanced message (either by editing the text generally input as a desired text message or by editing how the music or other media will be matched or otherwise merged with the text selection). In this exemplary embodiment, if multiple music parts are being matched to a single text message, the user-edit feature may allow the user to experiment with fitting music pieces together to a medley that may be enhanced via music editing applications for harmonizing tunes to fit together in a seamless or substantially seamless manner.

Once the user selects or otherwise edits a media-enhanced message (functional block 125), the media-enhanced or music-enhanced message is transmitted (functional block 130) to a recipient device (e.g., via a MMSC or other suitable communication link). It will be appreciated that the music-enhanced or media-enhanced message may be displayed to the recipient in a number of different and interesting formats. For example, the music message may be displayed as a karaoke screen with a marker (bouncing ball) following the text as the corresponding song is being played. Other graphical enhancements, such as change and movement of color or font of the message text synchronized to the accompanying song may be displayed to the user. In another exemplary display embodiment, the recipient of the media-enhanced message may want access to the entire song or other media content that is linked to the text message. In this embodiment, the media-enhanced message may include hyperlinks (e.g., portions of the text within the media-enhanced message may include hyperlinks suitable for downloading songs or other media content associated with the media-enhanced message). Providing such hyperlinks for downloading songs or other media may provide additional opportunity for the application to become a sales benefit for operators (downloading services or the like). Of course, other display features or novelties may become apparent to a skilled artisan upon reading of the present disclosure.

Other display and/or application features may be included, such as a recipient rating or voting feature, whereby the recipient of the received media-enhanced message may vote or otherwise provide feedback to the sender of the media-enhanced message relating to whether or not the recipient enjoys the songs, video clips or the like associated with the media-enhanced message. Such voting or rating may include simple actuation of a "thumbs up" or "thumbs down" rating system. While aspects of the technology are being described with respect to transmitting the media-enhanced message to a recipient device (where the media-enhanced message and media portions associated with the media-enhanced message are stored, at least temporarily on the local memory of the recipient's portable communication device), it will be appreciated that other variations may be employed without departing from the scope of the present invention). For example, the media-enhanced message may be saved on a remote server or database, whereby a simple message (a SMS message) is sent to the recipient indicating that a media-enhanced message is available. The recipient of the SMS message may visit or otherwise access a website where the media-enhanced message may be experienced.

By way of simple example, the user of the portable communication device may compose the following exemplary text message, "Baby, will you join me for a walk on the beach? Tuesday afternoon at 4?/Johnny." The media-enhanced messaging application may initiate a search for suitable songs (e.g., songs having lyrics that match, substantially match or otherwise correspond to the entered message text). The media-enhanced messaging application may find one or more suitable songs, which is/are merged with the received message text to provide a media-enhanced message where the message text is delivered in a melodic format with song lyrics stating, "Oh, baby (oh, ah)/won't you/walk with me/on the beach? Tuesday afternoon/at 4 o'clock?/Johnny" In this example, a user's rather ordinary text message in transformed into a more entertaining and personal delivery of a media-enhanced message. In the case of incorporating other media clips into the media-enhanced message, well-known movie or television phrases, such as "I'll be back" or "hasta la vista, baby" may be incorporated into the media-enhanced message.

It will be appreciated that a portable communication device equipped with media-enhanced messaging functionality provides the user with the ability to enhance his/her messaging experience by facilitating message enhancement for emotional expression, enunciation and entertainment. The media-enhanced messaging application described in this disclosure provides the user of the portable communication device with the ability to transform a simple text message into a more engaging messaging experience, where the user now has the ability to "say it with a song."

As will be appreciated by one of skill in the art, computer program elements and/or circuitry elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A portable communication device comprising:
   a memory; and
   a controller coupled to the memory, wherein the controller executes a media-enhanced messaging application program stored on a machine-readable medium, wherein when the media-enhanced messaging application program is loaded in memory in the portable communication device and executed causes the portable communication device to:
   receive text message input;
   search for songs having lyrics substantially matching at least a portion of the received text message input; and
   merge songs having lyrics substantially matching at least the portion of the received text message input with the text message input;
   wherein the media-enhanced messaging application program causes the portable communication device to create a media-enhanced text message having received text message input accompanied by media lyrics substantially corresponding to at least a portion of the text message input.

2. The portable communication device according to claim 1, wherein the media-enhanced messaging application program causes the portable communication device to transmit a media-enhanced text message to a remote device.

3. A portable communication device comprising:
   a memory; and
   a controller coupled to the memory, wherein the controller executes a media-enhanced messaging application program stored on a machine-readable medium, wherein when the media-enhanced messaging application program is loaded in memory in the portable communication device and executed causes the portable communication device to:
   receive text message input;
   search for media having verbal portions substantially matching at least a portion of the received text message input; and
   merge media having verbal portions substantially matching at least the portion of the received text message input with the text message input;
   wherein the media-enhanced messaging application program causes the portable communication device to create a media-enhanced text message having received text message input accompanied by verbal portions substantially corresponding to at least a portion of the text message input.

4. The portable communication device according to claim 1, wherein the media-enhanced messaging application program causes the portable communication device to provide a user with a preview of one or more media-enhanced text messages based on media found during the search for media.

5. The portable communication device according to claim 4, wherein the media-enhanced messaging application program causes the portable communication device to receive a user selection and/or user editing of at least one of the previewed media-enhanced text messages.

6. The portable communication device according to claim 1, wherein the media-enhanced messaging application program causes the portable communication device to create a media-enhanced text message having the received text message input accompanied by a first song lyric portion corresponding to a first portion of the received text message input and a second song lyric portion corresponding to a second portion of the received text message input.

7. The portable communication device according to claim 1, wherein the media-enhanced messaging application program causes the portable communication device to suggest an alternative phrasing of the received text message input, the alternative phrasing better corresponding to media found during the search.

8. The portable communication device according to claim 1, wherein the portable communication device is a mobile telephone.

9. A method of generating a media-enhanced text message implemented on a portable communication device, the method comprising:
   receiving text message input;

searching for media corresponding to at least a portion of the received text message input, wherein searching for media includes searching for songs having lyrics substantially matching at least a portion of the received text message input;

merging the corresponding media with the text message input; and creating a media-enhanced text message having received text message input accompanied by media portions substantially corresponding to at least a portion of the text message input.

10. The method according to claim 9, further comprising:
transmitting the media-enhanced text message to a remote device.

11. The method according to claim 9, wherein searching for media includes searching for songs based on a user-defined category of music.

12. The method according to claim 9, further comprising:
providing a user with a preview of one or more media-enhanced text messages based on media found during the searching step.

13. The method according to claim 12, further comprising:
receiving a user selection and/or user editing of at least one of the previewed media-enhanced text messages.

14. The method according to claim 9, wherein merging includes incorporating corresponding portions of media found during the searching with corresponding portions of the text message input.

15. The method according to claim 9, wherein the media-enhanced text message includes the text message input accompanied by media lyrics substantially corresponding to the text message input.

16. The method according to claim 11, wherein the media-enhanced text message includes the text message input accompanied by a first song lyric portion corresponding to a first portion of the text message input and a second song lyric portion corresponding to a second portion of the text message input.

17. A program stored on a non-transitory machine-readable medium, the program being suitable for use on a portable communication device, wherein when the program is loaded in memory in the portable communication device and executed causes the portable communication device to:

receive text message input;

search for media matching or corresponding to at least a portion of the received text message input, wherein searching for media includes searching for songs having lyrics substantially matching at least a portion of the received text message input;

merge the matching media with the text message input; and create a media-enhanced text message having received text message input accompanied by media portions substantially corresponding to at least a portion of the text message input.

\* \* \* \* \*